US008810205B2

(12) United States Patent
Ichikawa

(10) Patent No.: US 8,810,205 B2
(45) Date of Patent: Aug. 19, 2014

(54) CHARGING DEVICE FOR VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 13/203,862

(22) PCT Filed: May 14, 2009

(86) PCT No.: PCT/JP2009/058979
§ 371 (c)(1),
(2), (4) Date: Aug. 30, 2011

(87) PCT Pub. No.: WO2010/131349
PCT Pub. Date: Nov. 18, 2010

(65) Prior Publication Data
US 2012/0043807 A1 Feb. 23, 2012

(51) Int. Cl.
*H02J 7/00* (2006.01)
*B60L 11/18* (2006.01)

(52) U.S. Cl.
CPC .............. B60L 11/182 (2013.01); *Y02T 90/14* (2013.01); *Y02T 10/7088* (2013.01); *B60L 11/1809* (2013.01); *Y02T 90/122* (2013.01); *Y02T 90/121* (2013.01); B60L 11/1816 (2013.01); *Y02T 10/7005* (2013.01)
USPC ........... 320/138; 320/104; 320/108; 320/107; 320/109; 320/134

(58) Field of Classification Search
CPC ............ B60L 11/1809; B60L 11/1811; B60L 11/1812; B60L 11/1816; B60L 11/1818; B60L 11/182; B60L 11/1824; B60L 11/1825; B60L 11/1838; B60L 11/1844; B60L 11/1827; B60L 11/1801; B60L 11/1851
USPC ................. 320/104, 109, 107, 108, 137, 138; 307/43, 9.1
See application file for complete search history.

(56) References Cited

U.S. PATENT DOCUMENTS 5,642,270 A * 6/1997 Green et al. ..................... 363/17
5,886,424 A * 3/1999 Kim ................................ 307/64
(Continued)

FOREIGN PATENT DOCUMENTS

AU 2006269374 B2 1/2007
AU 2006269374 C1 1/2007
(Continued)

OTHER PUBLICATIONS

International Search Report issued in International Application No. PCT/JP2009/058979 on Aug. 11, 2009 (with translation).

*Primary Examiner* — Edward Tso
*Assistant Examiner* — Alexis Boateng
(74) *Attorney, Agent, or Firm* — Oliff PLC

(57) ABSTRACT

An electric power reception terminal is configured such that it can electrically be connected to an AC power supply. A charger is configured to convert AC power input from the electric power reception terminal to a prescribed DC voltage. A non-contact electric power reception portion is configured to receive electric power in a non-contact manner from an AC power supply as a result of magnetic coupling to an electric power transmission portion of the AC power supply. The non-contact electric power reception portion is connected to an electric power conversion circuit of the charger. A charge ECU compares conductive-reception electric power with non-contact-reception electric power, and controls the charger to perform charging by using any greater one of the conductive-reception electric power and the non-contact-reception electric power, based on a result of comparison.

10 Claims, 10 Drawing Sheets

(56) References Cited

U.S. PATENT DOCUMENTS

| | | | |
|---|---|---|---|
| 6,288,522 B1* | 9/2001 | Odaohhara et al. | 320/138 |
| 7,741,734 B2 | 6/2010 | Joannopoulos et al. | |
| 7,768,229 B2* | 8/2010 | Zhang et al. | 320/104 |
| 7,923,951 B2* | 4/2011 | Soma et al. | 318/376 |
| 2007/0222542 A1 | 9/2007 | Joannopoulos et al. | |
| 2008/0169651 A1* | 7/2008 | Oyobe et al. | 290/7 |
| 2008/0174277 A1* | 7/2008 | Ueno | 320/138 |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0181963 A1* | 7/2010 | Schreiber | 320/108 |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2013/0193751 A1* | 8/2013 | Sugiyama et al. | 307/9.1 |
| 2013/0285602 A1* | 10/2013 | Nergaard et al. | 320/108 |
| 2014/0062394 A1* | 3/2014 | Khan et al. | 320/108 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-11-252810 | 9/1999 |
| JP | A-2003-47163 | 2/2003 |
| JP | A-2008-220130 | 9/2008 |
| JP | A-2009-501510 | 1/2009 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2009/054221 A1 | 4/2009 |

* cited by examiner

CHARGING DEVICE FOR VEHICLE

TECHNICAL FIELD

The present invention relates to a charging device for a vehicle, and particularly to a charging device for a vehicle for charging a power storage device mounted on a vehicle from an AC power supply outside the vehicle.

BACKGROUND ART

Japanese Patent Laying-Open No. 2008-220130 (PTL 1) discloses a power supply system for a vehicle, in which a power storage portion such as a secondary battery or an electric double layer capacitor is chargeable from a power supply outside the vehicle. This power supply system for a vehicle includes conduction charging means for charging a power storage portion by supplying and receiving electric power while a power supply outside the vehicle and the power supply system are electrically connected to each other (conductive charging), induction charging means for charging the power storage portion by supplying and receiving electric power while a power supply outside the vehicle and the power supply system are magnetically coupled to each other (inductive charging), and a charging control device for selecting one of the conduction charging means and the induction charging means.

According to this power supply system for a vehicle, conductive charging using the conduction charging means or inductive charging using the induction charging means can be selected for charging the power storage portion, so that an area where the power storage portion is chargeable can be expanded (see PTL 1).

CITATION LIST

Patent Literature

PTL 1: Japanese Patent Laying-Open No. 2008-220130
PTL 2: Japanese Patent Laying-Open No. 2003-47163

SUMMARY OF INVENTION

Technical Problem

The power supply system for a vehicle disclosed in Japanese Patent Laying-Open No. 2008-220130 above is useful in that an area where the power storage portion is chargeable can be expanded. In the power supply system for a vehicle above, selection between conductive charging (what is called plug-in charging) using the conduction charging means and inductive charging (non-contact charging) using the induction charging means can be made with a selection switch, however, the selected charging method is not necessarily an efficient charging method.

Therefore, an object of the present invention is to achieve efficient charging in a charging device for a vehicle capable of charging by using both of conductive charging (plug-in charging) and inductive charging (non-contact charging).

Solution to Problem

According to the present invention, a charging device for a vehicle is a charging device for a vehicle for charging a power storage device mounted on a vehicle from an AC power supply outside the vehicle, and the charging device for a vehicle includes an electric power reception terminal, a charger, a non-contact electric power reception portion, and a control device. The electric power reception terminal is configured such that it can electrically be connected to the AC power supply. The charger is configured to convert AC power input from the electric power reception terminal to a prescribed DC voltage. The non-contact electric power reception portion is configured to receive electric power in a non-contact manner from the AC power supply as a result of magnetic coupling to an electric power transmission portion of the AC power supply. This non-contact electric power reception portion is connected to an electric power conversion circuit of the charger. The control device compares first received electric power indicating electric power input from the electric power reception terminal with second received electric power indicating electric power received by the non-contact electric power reception portion and controls the charger to perform charging by using any greater one of the first received electric power and the second received electric power, based on a result of comparison.

In this charging device for a vehicle, as the charger is controlled to perform charging by using any greater one of the first received electric power indicating electric power input from the electric power reception terminal and the second received electric power indicating electric power received by the non-contact electric power reception portion, a time period for charging is shortened. Therefore, according to this charging device for a vehicle, efficient charging can be achieved in a charging device for a vehicle capable of charging by using both of conductive charging (plug-in charging) and inductive charging (non-contact charging).

Preferably, the control device controls the charger to perform charging by using the first received electric power when lowering in electric power reception efficiency is sensed based on a state quantity indicating lowering in efficiency of electric power reception by the non-contact electric power reception portion.

Preferably, the charger includes first and second rectifier units, an inverter, and an isolation transformer. The first rectifier unit is configured to be able to rectify the AC power input from the electric power reception terminal. The inverter is connected to the first rectifier unit. The isolation transformer is connected to the inverter. The second rectifier unit is configured to rectify an output from the isolation transformer. The non-contact electric power reception portion is connected to any of the first and second rectifier units.

Alternatively, preferably, the charger includes first and second rectifier units, an inverter, and an isolation transformer. The first rectifier unit is configured to be able to rectify the AC power input from the electric power reception terminal. The inverter is connected to the first rectifier unit. The isolation transformer is connected to the inverter. The second rectifier unit is configured to rectify an output from the isolation transformer. The non-contact electric power reception portion includes an electric power reception coil and a third rectifier unit. The electric power reception coil is configured to magnetically be coupled to an electric power transmission coil provided in the electric power transmission portion. The third rectifier unit is configured to rectify an output from the electric power reception coil. The third rectifier unit is connected between the first rectifier unit and the inverter.

Alternatively, according to the present invention, a charging device for a vehicle is a charging device for a vehicle for charging a power storage device mounted on a vehicle from an AC power supply outside the vehicle, and the charging device for a vehicle includes an electric power reception terminal, a charger, a non-contact electric power reception portion, and a control device. The electric power reception terminal is configured such that it can electrically be connected to the AC power supply. The charger is configured to convert AC power input from the electric power reception terminal to a prescribed DC voltage. The non-contact electric power reception portion is configured to receive electric power in a non-contact manner from the AC power supply as a result of magnetic coupling to an electric power transmission portion of the AC power supply. The control device controls the charger. The charger includes first and second rectifier units, an inverter, and an isolation transformer. The first rectifier unit is configured to be able to rectify the AC power input from the electric power reception terminal. The inverter is connected to the first rectifier unit. The isolation transformer is connected to the inverter. The second rectifier unit is configured to rectify an output from the isolation transformer. The non-contact electric power reception portion includes an electric power reception coil and a third rectifier unit. The electric power reception coil is configured to magnetically be coupled to an electric power transmission coil provided in the electric power transmission portion. The third rectifier unit is configured to rectify an output from the electric power reception coil. The third rectifier unit is connected between the first rectifier unit and the inverter. Here, the control device adjusts a DC voltage between the first rectifier unit and the inverter between which the third rectifier unit is connected based on magnitude of electric power received by the non-contact electric power reception portion, when charging is performed by using electric power received by the non-contact electric power reception portion.

In this charging device for a vehicle, when charging is performed by using the non-contact electric power reception portion, a DC voltage between the first rectifier unit and the inverter between which the non-contact electric power reception portion is connected is adjusted based on magnitude of electric power received by the non-contact electric power reception portion. Accordingly, impedance can be matched between an electric power transmission side (a power feed facility) and an electric power reception side (a vehicle). Therefore, according to this charging device for a vehicle, further efficient charging can be achieved in a charging device for a vehicle capable of charging by using both of conductive charging (plug-in charging) and inductive charging (non-contact charging).

Preferably, the control device adjusts the DC voltage between the first rectifier unit and the inverter between which the third rectifier unit is connected based on magnitude of electric power received by the non-contact electric power reception portion, when charging is performed simultaneously by using both of electric power received by the non-contact electric power reception portion and electric power input from the electric power reception terminal.

Preferably, the control device adjusts the DC voltage to a square root value of a value obtained by multiplying a value of electric power received by the non-contact electric power reception portion by target impedance.

Advantageous Effects of Invention

According to this charging device for a vehicle, efficient charging can be achieved in a charging device for a vehicle capable of charging by using both of conductive charging (plug-in charging) and inductive charging (non-contact charging).

DESCRIPTION OF EMBODIMENTS

Figure 1:
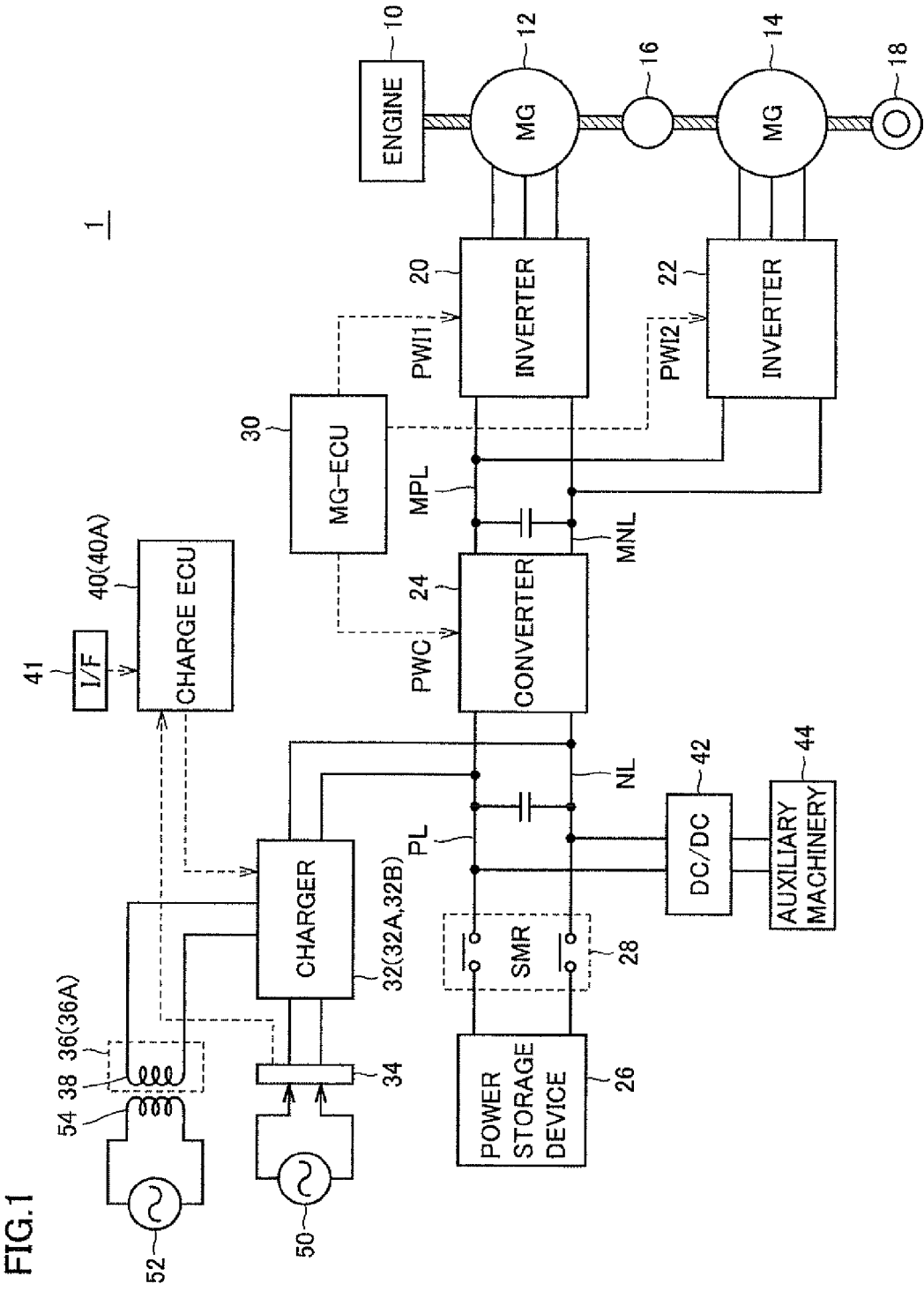
FIG. 1 is a diagram showing an overall configuration of a vehicle to which a charging device for a vehicle according to a first embodiment of the present invention is applied.

An embodiment of the present invention will be described hereinafter in detail with reference to the drawings. In the drawings, the same or corresponding elements have the same reference characters allotted, and description thereof will not be repeated.

First Embodiment

FIG. 1 is a diagram showing an overall configuration of a vehicle to which a charging device for a vehicle according to a first embodiment of the present invention is applied. Referring to FIG. 1, a vehicle 1 includes an engine 10, motor generators 12 and 14, a power split device 16, and driving wheels 18. In addition, vehicle 1 further includes inverters 20 and 22, a converter 24, a power storage device 26, a system main relay (SMR) 28, and an MG-ECU (Electronic Control Unit) 30. Moreover, vehicle 1 further includes a charger 32, an electric power reception terminal 34, a non-contact electric power reception portion 36, a charge ECU 40, and a communication device 41. Furthermore, vehicle 1 further includes a DC/DC converter 42 and auxiliary machinery 44.

Engine 10 is configured to be able to convert thermal energy generated by combustion of fuel to kinetic energy for a moving element such as a piston or a rotor and to output the energy to power split device 16. Power split device 16 is configured to be able to split kinetic energy generated by engine 10 between motor generator 12 and driving wheels 18. For example, a planetary gear having three rotation shafts of a sun gear, a planetary carrier and a ring gear respectively can be employed as power split device 16, and these three rotation shafts are coupled to the rotation shaft of motor generator 12, a crankshaft of engine 10, and a drive shaft (driving wheel 18) of the vehicle, respectively.

Motor generators 12 and 14 are AC motors and each of them is a three-phase AC synchronous motor in which a permanent magnet is embedded in a rotor, for example. Motor generator 12 has its rotation shaft coupled to power split device 16 and it is driven by inverter 20. Motor generator 12 receives kinetic energy generated by engine 10 from power split device 16, converts the kinetic energy to electric energy, and outputs the electric energy to inverter 20. In addition, motor generator 12 generates drive force by using three-phase AC power received from inverter 20 and also starts engine 10.

Motor generator 14 has its rotation shaft coupled to the drive shaft (driving wheel 18) of the vehicle. Motor generator 14 is driven by inverter 22 and it generates drive torque of the vehicle by using three-phase AC power received from inverter 22. In addition, during braking of the vehicle or during suppression of acceleration on a downslope, motor generator 14 receives mechanical energy stored in the vehicle as kinetic energy or potential energy from driving wheels 18, converts the energy to electric energy (regeneration), and outputs the electric energy to inverter 22.

Engine 10 is incorporated in vehicle 1 as a motive power source for driving driving wheels 18 and driving motor generator 12. Motor generator 12 is incorporated in vehicle 1 so as to operate as a generator driven by engine 10 and to operate as a motor capable of starting engine 10. Meanwhile, motor generator 14 is incorporated in vehicle 1 so as to operate as a motor driving wheels 18 and to operate as a generator capable of regeneration using mechanical energy stored in the vehicle.

Inverter 20 drives motor generator 12 based on a signal PWI1 from MG-ECU 30 and inverter 22 drives motor generator 14 based on a signal PWI2 from MG-ECU 30. Inverters 20 and 22 are connected to a main positive bus MPL and a main negative bus MNL, and each of inverters 20 and 22 is implemented, for example, by a three-phase bridge circuit.

Inverter 20 drives motor generator 12 based on signal PWI1 in a regenerative mode, converts electric power generated by motor generator 12 to DC power, and outputs the DC power to main positive bus MPL and main negative bus MNL. In addition, at the time of start of engine 10, inverter 20 drives motor generator 12 based on signal PWI1 in a power running mode, converts DC power supplied from main positive bus MPL and main negative bus MNL to AC power, and outputs the AC power to motor generator 12.

Inverter 22 drives motor generator 14 based on signal PWI2 in a power running mode, converts DC power supplied from main positive bus MPL and main negative bus MNL to AC power, and outputs the AC power to motor generator 14. In addition, during braking of the vehicle or during suppression of acceleration on a downslope, inverter 22 drives motor generator 14 based on signal PWI2 in a regenerative mode, converts electric power generated by motor generator 14 to DC power, and outputs the DC power to main positive bus MPL and main negative bus MNL.

Converter 24 is connected between a positive electrode line PL, a negative electrode line NL and main positive bus MPL, main negative bus MNL. Converter 24 steps up a voltage between main positive bus MPL and main negative bus MNL to a voltage not lower than a voltage between positive electrode line PL and negative electrode line NL based on a signal PWC from MG-ECU 30. Converter 24 is implemented, for example, by a step-up chopper circuit.

Power storage device 26 is a rechargeable DC power supply, and it is implemented, for example, by a secondary battery such as a nickel metal hydride battery or a lithium ion battery. Power storage device 26 is electrically connected to positive electrode line PL and negative electrode line NL through system main relay 28, and it outputs electric power to positive electrode line PL and negative electrode line NL. In addition, power storage device 26 is charged as it receives from converter 24, electric power generated by at least one of motor generators 12 and 14. Moreover, power storage device 26 is charged as it receives from charger 32, electric power supplied by AC power supply 50 or 52 outside the vehicle. It is noted that a large-capacity capacitor may also be adopted as power storage device 26.

System main relay 28 is provided between power storage device 26 and positive electrode line PL, negative electrode line NL, and it is turned on at the time of start of a vehicle system or during a period in which power storage device 26 is charged by AC power supply 50 (or 52).

Charger 32 is connected to positive electrode line PL and negative electrode line NL. Charger 32 is configured to receive AC power supplied by AC power supply 50 from electric power reception terminal 34, to convert the AC power input from electric power reception terminal 34 to a voltage level adapted to power storage device 26 based on a control signal from charge ECU 40, and to be able to output the voltage level to positive electrode line PL and negative electrode line NL.

Here, non-contact electric power reception portion 36 (which will be described later) is connected to charger 32. Charger 32 is configured to receive from non-contact electric power reception portion 36, AC power received from AC power supply 52 by non-contact electric power reception portion 36, to convert the AC power received from non-contact electric power reception portion 36 to a voltage level adapted to power storage device 26 based on a control signal from charge ECU 40, and to be able to output the voltage level to positive electrode line PL and negative electrode line NL.

As will be described later, whether charger 32 subjects AC power input from electric power reception terminal 34 to voltage conversion for output or AC power received from non-contact electric power reception portion 36 to voltage conversion for output is controlled by charge ECU 40, based on the AC power input from electric power reception terminal 34 and the AC power received from non-contact electric power reception portion 36. It is noted that the configuration of charger 32 will be described in detail later.

Electric power reception terminal 34 is an electric power interface for conductive charging from AC power supply 50 outside the vehicle. Electric power reception terminal 34 is configured such that it can electrically be connected to a power receptacle or the like (not shown) of AC power supply 50.

Non-contact electric power reception portion 36 is an electric power interface for inductive charging (non-contact charging) from AC power supply 52 outside the vehicle. Non-contact electric power reception portion 36 includes an electric power reception coil 38 that can magnetically be coupled to an electric power transmission coil 54 of AC power supply 52. Electric power reception coil 38 receives electric power in a non-contact manner from AC power supply 52 as a result of magnetic coupling to electric power transmission coil 54 of AC power supply 52. It is noted that magnetic coupling between electric power reception coil 38 and electric power transmission coil 54 may be achieved by electromagnetic induction or by a resonance method in which electric power reception coil 38 and electric power transmission coil 54 resonate through magnetic field.

While power storage device 26 is charged by AC power supply 50 or 52, charge ECU 40 controls an operation of charger 32. Here, charge ECU 40 compares electric power input from electric power reception terminal 34 (hereinafter also referred to as "conductive-reception electric power") with electric power received by non-contact electric power reception portion 36 (hereinafter also referred to as "non-contact-reception electric power"), and controls charger 32 such that it performs charging by using any greater one of the conductive-reception electric power and the non-contact-reception electric power based on a result of comparison.

It is noted that conductive-reception electric power is calculated, for example, based on rated current information received through electric power reception terminal 34 via a charge cable connected to electric power reception terminal 34 and a voltage input to electric power reception terminal 34. Meanwhile, regarding non-contact-reception electric power, for example, electric power information indicating transmitted electric power from electric power transmission coil 54 is transmitted from a power feed facility to communication device 41, so that non-contact-reception electric power is calculated based on the electric power information received by communication device 41.

DC/DC converter 42 is connected to positive electrode line PL and negative electrode line NL. DC/DC converter 42 steps down electric power received from positive electrode line PL and negative electrode line NL to an operation voltage of auxiliary machinery 44 and outputs the voltage to auxiliary machinery 44. Auxiliary machinery 44 collectively represents each piece of auxiliary machinery in this vehicle 1 and it receives supply of electric power from DC/DC converter 42.

Figure 2:
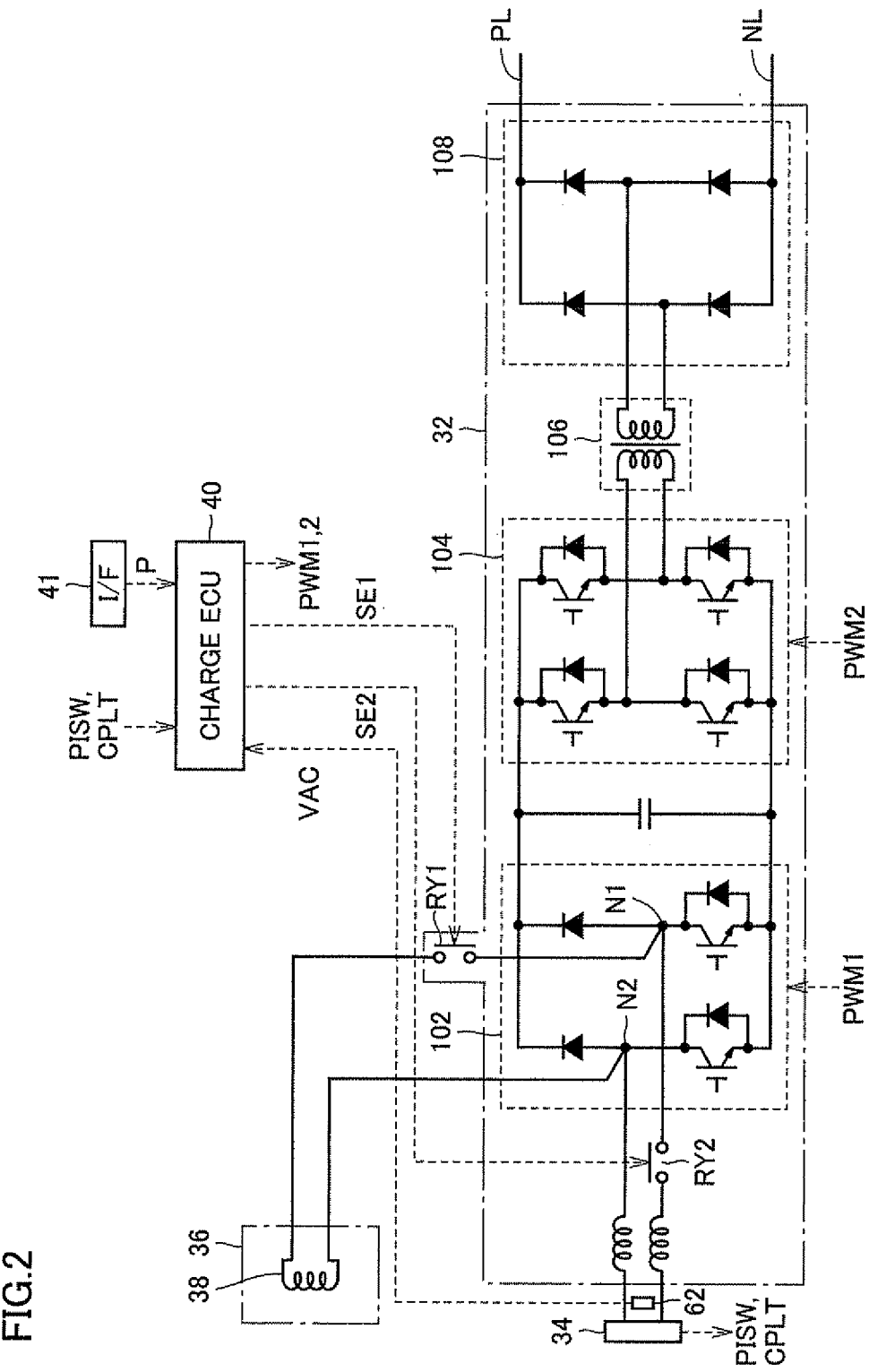
FIG. 2 is a diagram showing in detail a configuration of a charger shown in FIG. 1.

FIG. 2 is a diagram showing in detail a configuration of charger 32 shown in FIG. 1. Referring to FIG. 2, charger 32 includes a rectifier unit 102, an inverter 104, an isolation transformer 106, a rectifier unit 108, and relays RY1 and RY2.

Rectifier unit 102 includes two upper and lower arms connected in parallel and each of upper and lower arms includes two rectifier elements (diodes) connected in series. Electric power reception terminal 34 is connected to an intermediate point (node N1, N2) of each of upper and lower arms and rectifier unit 102 rectifies AC power input from electric power reception terminal 34. It is noted that a switching element is provided in the lower arm of the upper and lower arms and a reactor is further provided in an electric power line between electric power reception terminal 34 and node N1, N2. Thus, rectifier unit 102 implements a step-up chopper circuit together with the reactor, so that it can rectify and step up electric power input from electric power reception terminal 34 based on a signal PWM1 from charge ECU 40.

Inverter 104 is connected to rectifier unit 102, and it converts an output from rectifier unit 102 to alternating current based on a signal PWM2 from charge ECU 40. Inverter 104 is implemented, for example, by a full bridge circuit. Isolation transformer 106 is connected between inverter 104 and rectifier unit 108 and it electrically isolates an electric system of vehicle 1, to which rectifier unit 108 is connected, from AC power supply 50, to which electric power reception terminal 34 is connected.

Rectifier unit 108 includes two upper and lower arms connected in parallel between positive electrode line PL and negative electrode line NL and each of upper and lower arms includes two rectifier elements (diodes) connected in series. A secondary coil of isolation transformer 106 is connected to an intermediate node of each of upper and lower arms, and rectifier unit 108 rectifies an output from isolation transformer 106 and provides a resultant output to positive electrode line PL and negative electrode line NL.

In the present first embodiment, non-contact electric power reception portion 36 is connected to rectifier unit 102. Namely, electric power reception coil 38 of non-contact electric power reception portion 36 is connected to nodes N1 and N2 of rectifier unit 102. During non-contact charging in which non-contact electric power reception portion 36 receives charging electric power, electric power received by non-contact electric power reception portion 36 is rectified by rectifier unit 102.

As the AC power received by non-contact electric power reception portion 36 has a high frequency (in particular, in the resonance method, the received AC power may have a frequency in a range from 1 M to 10 MHz or higher), a rectifier element excellent in high-frequency rectification characteristics is preferably used for rectifier unit 102 to which non-contact electric power reception portion 36 is connected. For example, silicon carbide (SiC), gallium nitride (GaN) and the like are known to have high-frequency rectification characteristics superior to silicon (Si) in general.

Relay RY1 is provided between node N1 of rectifier unit 102 and non-contact electric power reception portion 36. Relay RY2 is provided between node N1 of rectifier unit 102 and electric power reception terminal 34. Relays RY1 and RY2 are turned on/off in response to signals SE1 and SE2 from charge ECU 40, respectively.

Charge ECU 40 receives a cable connection signal PISW and a pilot signal CPLT from electric power reception terminal 34. Cable connection signal PISW is a signal indicating connection between a not-shown charge cable and electric power reception terminal 34. Pilot signal CPLT is a pulse signal transmitted through the charge cable connected to electric power reception terminal 34, and a rated current of charging electric power is indicated, for example, by duty of a pulse.

A voltage sensor 62 detects a voltage VAC indicating a voltage input to electric power reception terminal 34 and outputs a detected value to charge ECU 40. Communication device 41 receives from a power feed facility, information on electric power P transmitted from the power feed facility of not-shown AC power supply 52 to non-contact electric power reception portion 36, and outputs the received information on electric power P to charge ECU 40.

Then, charge ECU 40 calculates electric power input from electric power reception terminal 34, that is, conductive-reception electric power, based on a rated current value indicated by pilot signal CPLT and a voltage value detected by voltage sensor 62. In addition, charge ECU 40 calculates electric power received by non-contact electric power reception portion 36, that is, non-contact-reception electric power, based on information on electric power P received by communication device 41. Then, charge ECU 40 compares the non-contact-reception electric power with the conductive-reception electric power, and when the non-contact-reception electric power is greater than the conductive-reception electric power, charge ECU 40 turns on and off relays RY1 and RY2, respectively. Thus, electric power (AC) received by non-contact electric power reception portion 36 is supplied to rectifier unit 102, which rectifies the electric power received from non-contact electric power reception portion 36 and outputs the rectified electric power to inverter 104. Then, inverter 104 converts the electric power (DC) output from rectifier unit 102 to alternating current, and rectifier unit 108 rectifies electric power (AC) received from isolation transformer 106 and outputs the rectified electric power to positive electrode line PL and negative electrode line NL. Thus, when the non-contact-reception electric power is greater than the conductive-reception electric power, non-contact charging using non-contact electric power reception portion 36 is performed.

On the other hand, when the non-contact-reception electric power is equal to or lower than the conductive-reception electric power, charge ECU 40 turns off and on relays RY1 and RY2, respectively. Thus, electric power (AC) input from electric power reception terminal 34 is supplied to rectifier unit 102, which rectifies the electric power input from electric power reception terminal 34 and outputs the rectified electric power to inverter 104. Subsequent inverter 104, isolation transformer 106 and rectifier unit 108 are as described above. Thus, when the non-contact-reception electric power is equal to or lower than the conductive-reception electric power, conductive charging in which electric power input from electric power reception terminal 34 is used for charging is performed.

Figure 3:
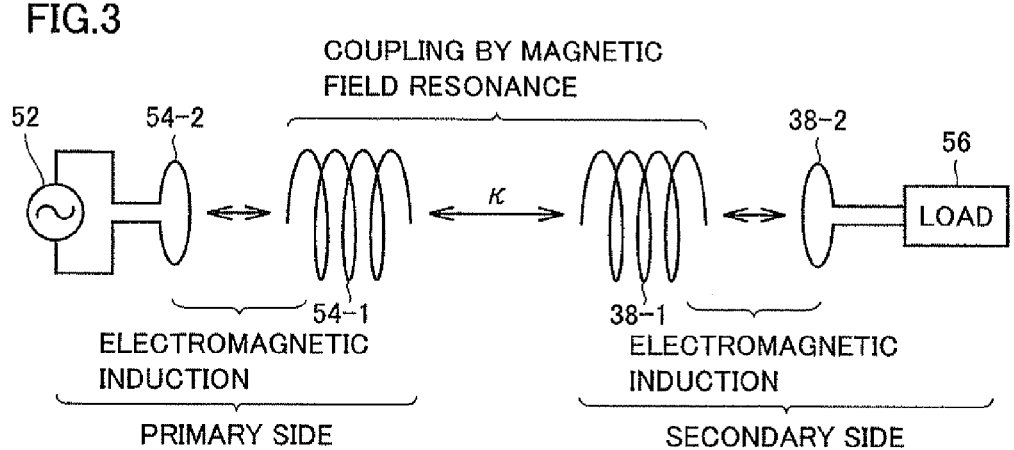
FIG. 3 is a diagram for illustrating a resonance method representing an exemplary manner of electric power reception by a non-contact electric power reception portion.

FIG. 3 is a diagram for illustrating a resonance method representing an exemplary manner of electric power reception by non-contact electric power reception portion 36. Referring to FIG. 3, in the resonance method, as in resonance of two tuning forks, two LC resonance coils having the same natural frequency resonate in an electromagnetic field (a near field), so that electric power is transmitted from one coil to the other coil through the electromagnetic field.

For example, a primary coil 54-2 is connected to AC power supply 52 and high-frequency electric power in a range from 1 M to 10 MHz or higher is fed to a primary self-resonance coil 54-1 magnetically coupled to primary coil 54-2 by electromagnetic induction. Primary self-resonance coil 54-1 is an LC resonator having inductance and stray capacitance of the coil itself, and it resonates with a secondary self-resonance coil 38-1 having the same resonant frequency as primary self-resonance coil 54-1 through the electromagnetic field (the near field). Then, energy (electric power) is transferred from primary self-resonance coil 54-1 to secondary self-resonance coil 38-1 through the electromagnetic field. The energy (electric power) transferred to secondary self-resonance coil 38-1 is extracted by a secondary coil 38-2 magnetically coupled to secondary self-resonance coil 38-1 by electromagnetic induction and supplied to a load 56. It is noted that electric power transmission with the resonance method is realized when a Q value indicating resonance intensity between primary self-resonance coil 54-1 and secondary self-resonance coil 38-1 is higher, for example, than 100.

It is noted that secondary self-resonance coil 38-1 and secondary coil 38-2 constitute electric power reception coil 38 in FIG. 2 and primary self-resonance coil 54-1 and primary coil 54-2 constitute electric power transmission coil 54 in FIG. 1.

As described above, electric power may be transmitted from electric power transmission coil 54 of AC power supply 52 to electric power reception coil 38 of non-contact electric power reception portion 36 through electromagnetic induction.

Figure 4:
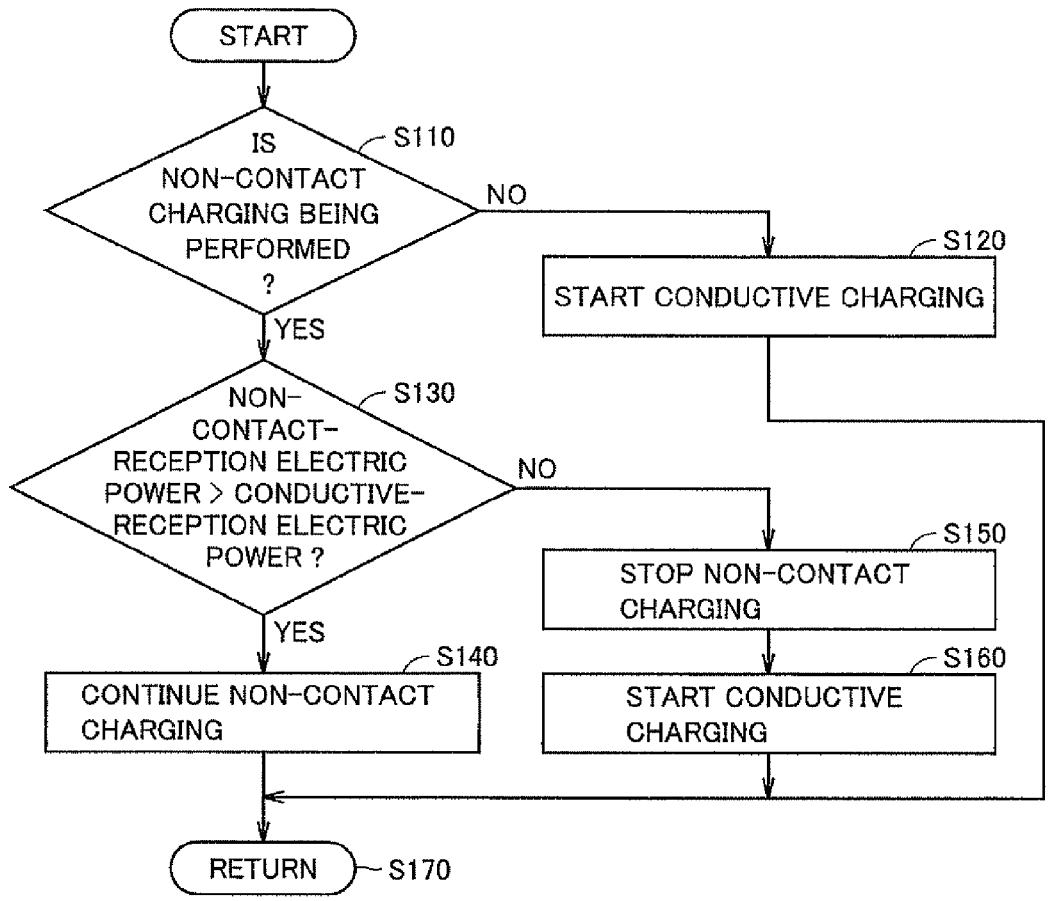
FIG. 4 is a flowchart showing a procedure of processing by a charge ECU when a connector of a charge cable is connected to an electric power reception terminal.
Figure 5:
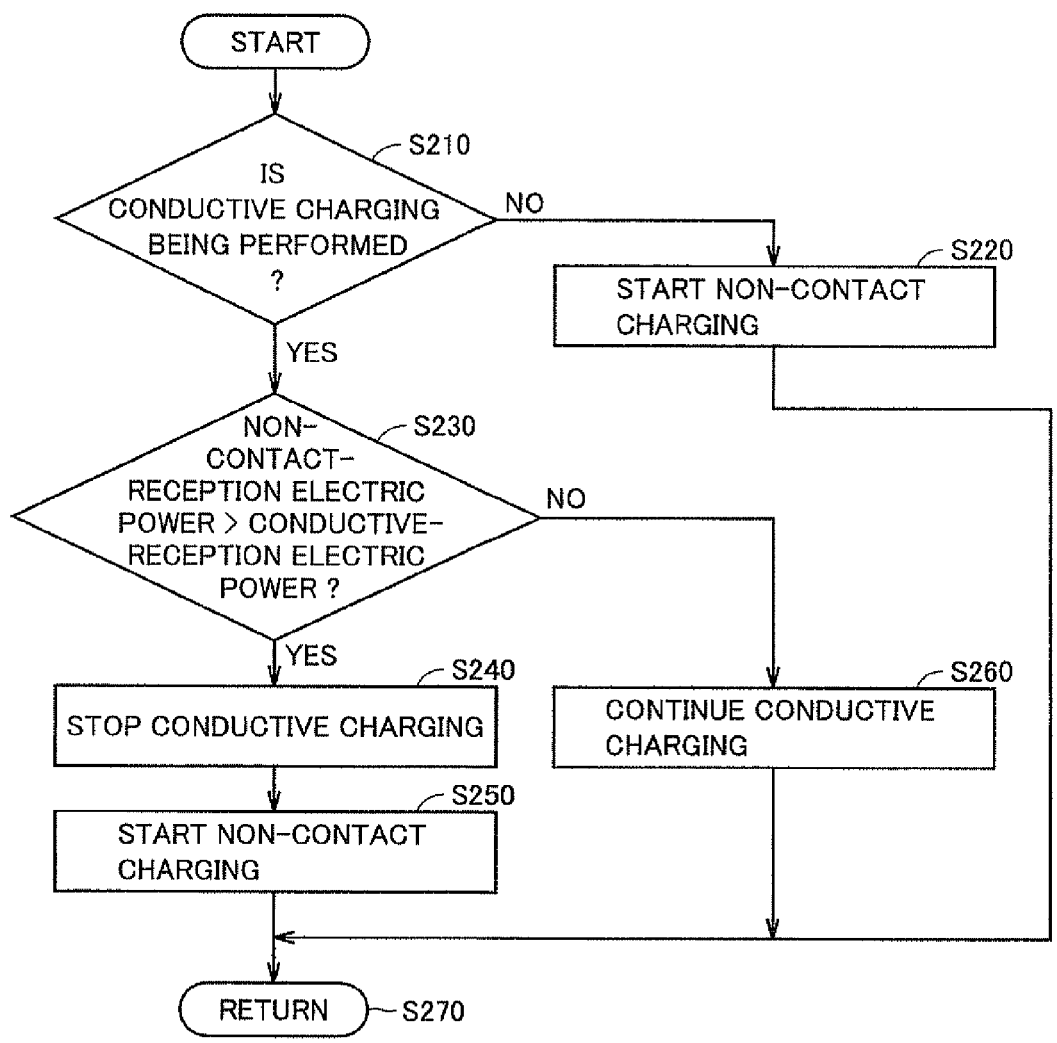
FIG. 5 is a flowchart showing a procedure of processing by the charge ECU when start of non-contact charging by using a non-contact electric power reception portion is indicated.

FIGS. 4 and 5 are diagrams for illustrating in further detail charging control carried out by charge ECU 40.

FIG. 4 is a flowchart showing a procedure of processing by charge ECU 40 when a connector of a charge cable is connected to electric power reception terminal 34. It is noted that connection of a connector of a charge cable to electric power reception terminal 34 is determined based on cable connection signal PISW (FIG. 2) from electric power reception terminal 34.

Referring to FIG. 4, when the connector of the charge cable is connected to electric power reception terminal 34, charge ECU 40 determines whether non-contact charging using non-contact electric power reception portion 36 is being performed or not (step S110). When it is determined that non-contact charging is not being performed (NO in step S110), charge ECU 40 turns off and on relays RY1 and RY2 (FIG. 2) respectively and starts conductive charging in which charging is performed by using the electric power input from electric power reception terminal 34 (step S120).

When it is determined in step S110 that non-contact charging is being performed (YES in step S110), charge ECU 40 determines whether non-contact-reception electric power (electric power received by non-contact electric power reception portion 36) is greater than conductive-reception electric power (electric power input from electric power reception terminal 34) or not (step S130). It is noted that the non-contact-reception electric power is calculated based on electric power output information from the power feed facility that is received by communication device 41 (FIG. 2). Meanwhile, the conductive-reception electric power is calculated based on a rated current value indicated by pilot signal CPLT (FIG. 2) received via the charge cable through electric power reception terminal 34 and a voltage detection value detected by voltage sensor 62 (FIG. 2).

When it is determined in step S130 that the non-contact-reception electric power is greater than the conductive-reception electric power (YES in step S130), charge ECU 40 continues non-contact charging using non-contact electric power reception portion 36 (step S140).

On the other hand, when it is determined in step S130 that the non-contact-reception electric power is equal to or lower than the conductive-reception electric power (NO in step S130), charge ECU 40 stops non-contact charging (step S150). Then, charge ECU 40 switches relay RY1 from ON to OFF and switches relay RY2 from OFF to ON, to thereby start conductive charging (step S160).

FIG. 5 is a flowchart showing a procedure of processing by charge ECU 40 when start of non-contact charging using non-contact electric power reception portion 36 is indicated. It is noted that indication of start of non-contact charging is determined, for example, based on whether or not a driver has turned on a non-contact charging switch provided at a driver's seat.

Referring to FIG. 5, when start of non-contact charging is indicated, charge ECU 40 determines whether conductive charging is being performed or not (step S210). When it is determined that conductive charging is not being performed (NO in step S210), charge ECU 40 turns on and off relays RY1 and RY2 (FIG. 2) respectively and starts non-contact charging using non-contact electric power reception portion 36 (step S220).

When it is determined in step S210 that conductive charging is being performed (YES in step S210), charge ECU 40 determines whether the non-contact-reception electric power is greater than the conductive-reception electric power or not (step S230). When it is determined that the non-contact-reception electric power is greater than the conductive-reception electric power (YES in step S230), charge ECU 40 stops conductive charging (step S240). Then, charge ECU 40 switches relay RY1 from OFF to ON and switches relay RY2 from ON to OFF, to thereby start non-contact charging (step S250).

On the other hand, when it is determined in step S230 that the non-contact-reception electric power is equal to or lower than the conductive-reception electric power (NO in step S230), charge ECU 40 continues conductive charging (step S260).

As described above, in the present first embodiment, non-contact electric power reception portion 36 is connected to charger 32 for conductive charging through electric power reception terminal 34. Then, as charge ECU 40 controls charger 32 such that it performs charging by using any greater one of the conductive-reception electric power and the non-contact-reception electric power, the time period for charging is shortened. Therefore, according to the present first embodiment, efficient charging can be achieved in a charging device for a vehicle capable of charging by using both of conductive charging (plug-in charging) and non-contact charging.

Second Embodiment

In the present second embodiment, further, when efficiency in non-contact charging using non-contact electric power reception portion 36 is determined as low, non-contact charging is prohibited and conductive charging is carried out.

An overall configuration of a vehicle in the present second embodiment is the same as that of vehicle 1 shown in FIG. 1. In addition, the configuration of charger 32 or non-contact electric power reception portion 36 is also the same as the configuration shown in FIG. 2.

Figure 6:
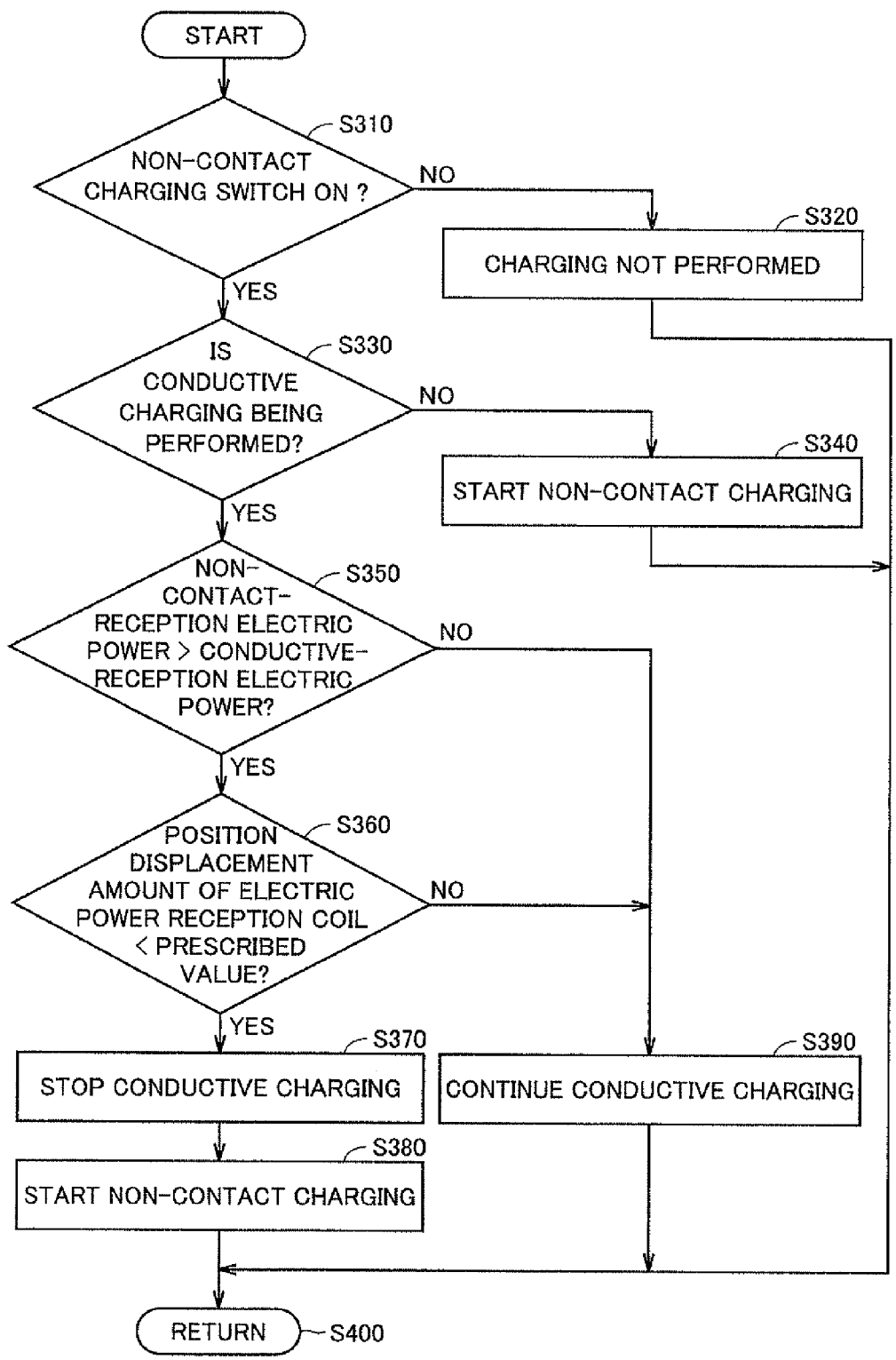
FIG. 6 is a flowchart showing a procedure of processing for prohibiting non-contact charging performed by the charge ECU.

FIG. 6 is a flowchart showing a procedure of processing for prohibiting non-contact charging performed by charge ECU 40. Referring to FIG. 6, charge ECU 40 determines whether or not a driver has turned on a non-contact charging switch provided at a driver's seat (step S310). When it is determined that the switch is OFF (NO in step S310), charge ECU 40 does not perform non-contact charging (step S320).

When it is determined in step S310 that the non-contact charging switch has been turned on (YES in step S310), charge ECU 40 determines whether conductive charging is being performed or not (step S330). When it is determined that conductive charging is not being performed (NO in step S330), charge ECU 40 starts non-contact charging using non-contact electric power reception portion 36 (step S340).

On the other hand, when it is determined in step S330 that conductive charging is being performed (YES in step S330), charge ECU 40 determines whether the non-contact-reception electric power is greater than the conductive-reception electric power or not (step S350).

When it is determined that the non-contact-reception electric power is greater than the conductive-reception electric power (YES in step S350), charge ECU 40 senses an amount of position displacement of electric power reception coil 38 (FIG. 1) of non-contact electric power reception portion 36 from electric power transmission coil 54 (FIG. 1) of the power feed facility and determines whether the position displacement amount is smaller than a prescribed amount or not (step S360). It is noted that the position displacement amount can be sensed by a position detection sensor or the like. In addition, a prescribed amount used for determination is set in advance based on efficiency of non-contact charging using non-contact electric power reception portion 36.

When it is determined that the position displacement amount of the electric power reception coil is smaller than the prescribed value (YES in step S360), charge ECU 40 stops conductive charging (step S370). Then, charge ECU 40 switches relay RY1 from OFF to ON and switches relay RY2 from ON to OFF, to thereby start non-contact charging (step S380).

On the other hand, when it is determined in step S350 that the non-contact-reception electric power is equal to or lower than the conductive-reception electric power (NO in step S350) or when it is determined in step S360 that the position displacement amount of the electric power reception coil is equal to or greater than the prescribed amount (NO in step S360), charge ECU 40 continues conductive charging without switching relays RY1 and RY2 (step S390).

In the description above, the amount of position displacement of electric power reception coil 38 from electric power transmission coil 54 in the power feed facility is sensed, and when the position displacement amount is equal to or greater than the prescribed value, it is assumed that efficiency of non-contact charging has lowered and non-contact charging is prohibited and instead conductive charging is performed. Electric power reception efficiency, however, may actually be sensed by actually transmitting electric power from electric power transmission coil 54 and by comparing electric power actually received by electric power reception coil 38 with transmitted electric power, without sensing a physical position displacement amount.

As described above, according to the present second embodiment, selection of non-contact charging poor in electric power reception efficiency can be prevented.

Third Embodiment

In the first and second embodiments, non-contact electric power reception portion 36 is connected to rectifier unit 102 of charger 32, however, a rectifier may be provided in the non-contact electric power reception portion and the non-contact electric power reception portion may be connected to a direct current portion of the charger.

Figure 7:
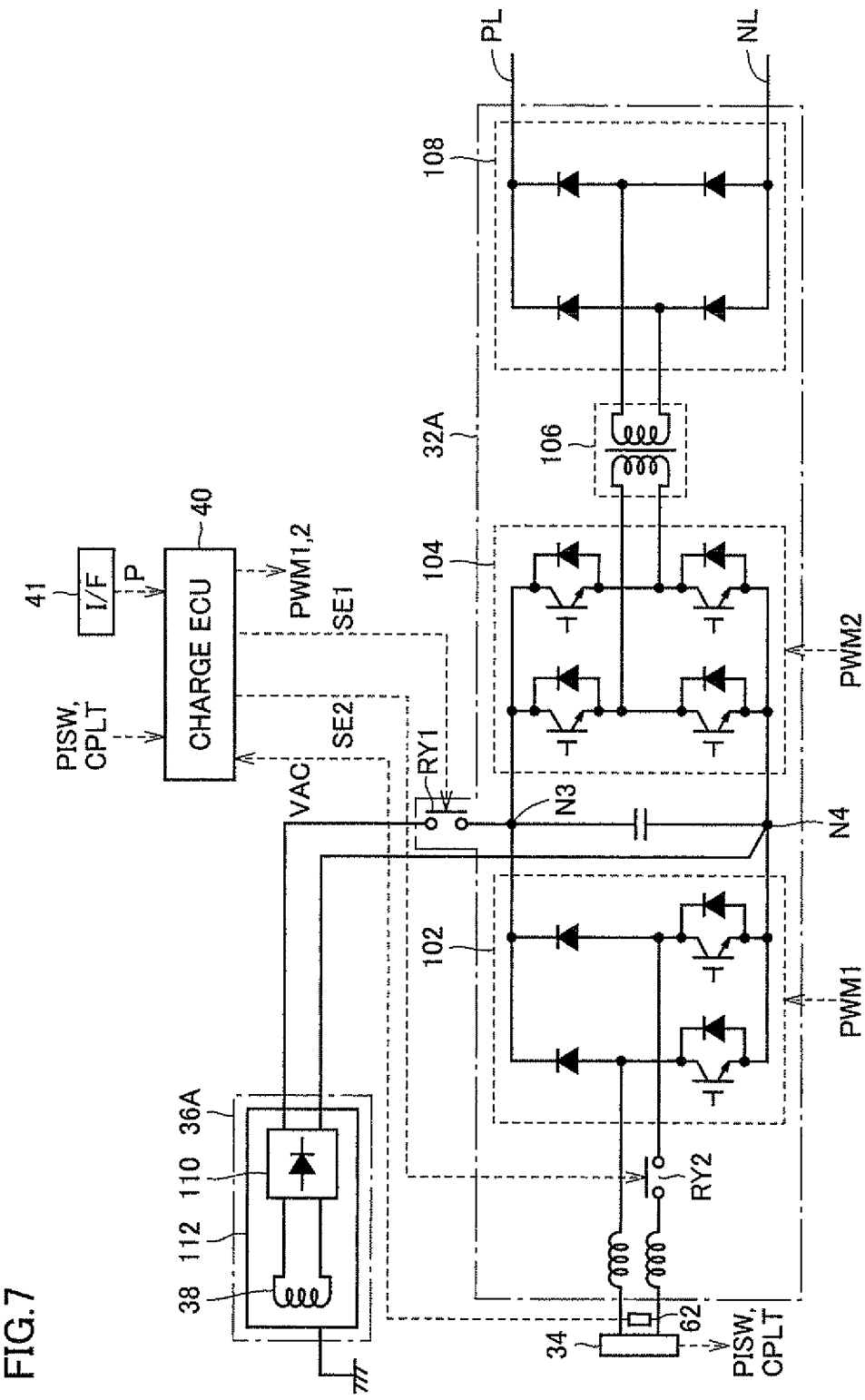
FIG. 7 is a diagram showing a configuration of a charging system in a third embodiment.

FIG. 7 is a diagram showing a configuration of a charging system in a third embodiment. Referring to FIG. 7, the charging system in the third embodiment includes electric power reception terminal 34, a charger 32A, a non-contact electric power reception portion 36A, charge ECU 40, and communication device 41.

The configuration of charger 32A is basically the same as that of charger 32 shown in FIG. 2, however, charger 32A is different from charger 32 in that non-contact electric power reception portion 36A is connected to nodes N3 and N4 in a DC link between rectifier unit 102 and inverter 104 and that relay RY1 is provided between node N3 and non-contact electric power reception portion 36A.

Non-contact electric power reception portion 36A includes electric power reception coil 38, a rectifier unit 110, and an electromagnetic shielding material 112. Rectifier unit 110 is connected to electric power reception coil 38, and it rectifies AC power received by electric power reception coil 38 and outputs the rectified AC power to charger 32A. For example, rectifier unit 110 includes two upper and lower arms connected in parallel as in rectifier units 102 and 108 within charger 32A, and each of upper and lower arms includes two rectifier elements (diodes) connected in series. Electric power reception coil 38 is connected to an intermediate point of each of upper and lower arms.

Electromagnetic shielding material 112 cuts off high-frequency electromagnetic waves (in the case of the resonance method, a frequency may be in a range from 1 M to 10 MHz or higher) generated around electric power reception coil 38 and rectifier unit 110 as electric power reception coil 38 receives electric power. Namely, high-frequency electromagnetic waves propagate also to rectifier unit 110 for rectifying AC power received by electric power reception coil 38, however, electromagnetic shielding material 112 shields electric power reception coil 38 and rectifier unit 110 together. Thus, diffusion of high-frequency electromagnetic waves generated in non-contact charging to a surrounding area can be prevented. It is noted that a member made of metal such as iron highly effective in electromagnetic shielding, a fabric having an effect to cut off electromagnetic waves, or the like can be adopted as electromagnetic shielding material 112.

As described above, according to the present third embodiment as well, an effect the same as in the first and second embodiments can be achieved. In addition, according to the present third embodiment, electric power reception coil 38 and rectifier unit 110 can together be shielded against electromagnetic waves and a shielding structure is simplified.

Fourth Embodiment

In the present fourth embodiment, conductive charging from electric power reception terminal 34 and non-contact charging using non-contact electric power reception portion 36A can simultaneously be carried out. When conductive charging and non-contact charging are simultaneously carried out, a voltage of a DC link in the charger, to which non-contact electric power reception portion 36A is connected, is controlled based of magnitude of the non-contact-reception electric power. Thus, impedance can be matched between an electric power transmission side and an electric power reception side in non-contact charging and highly efficient non-contact charging can be realized.

Figure 8:
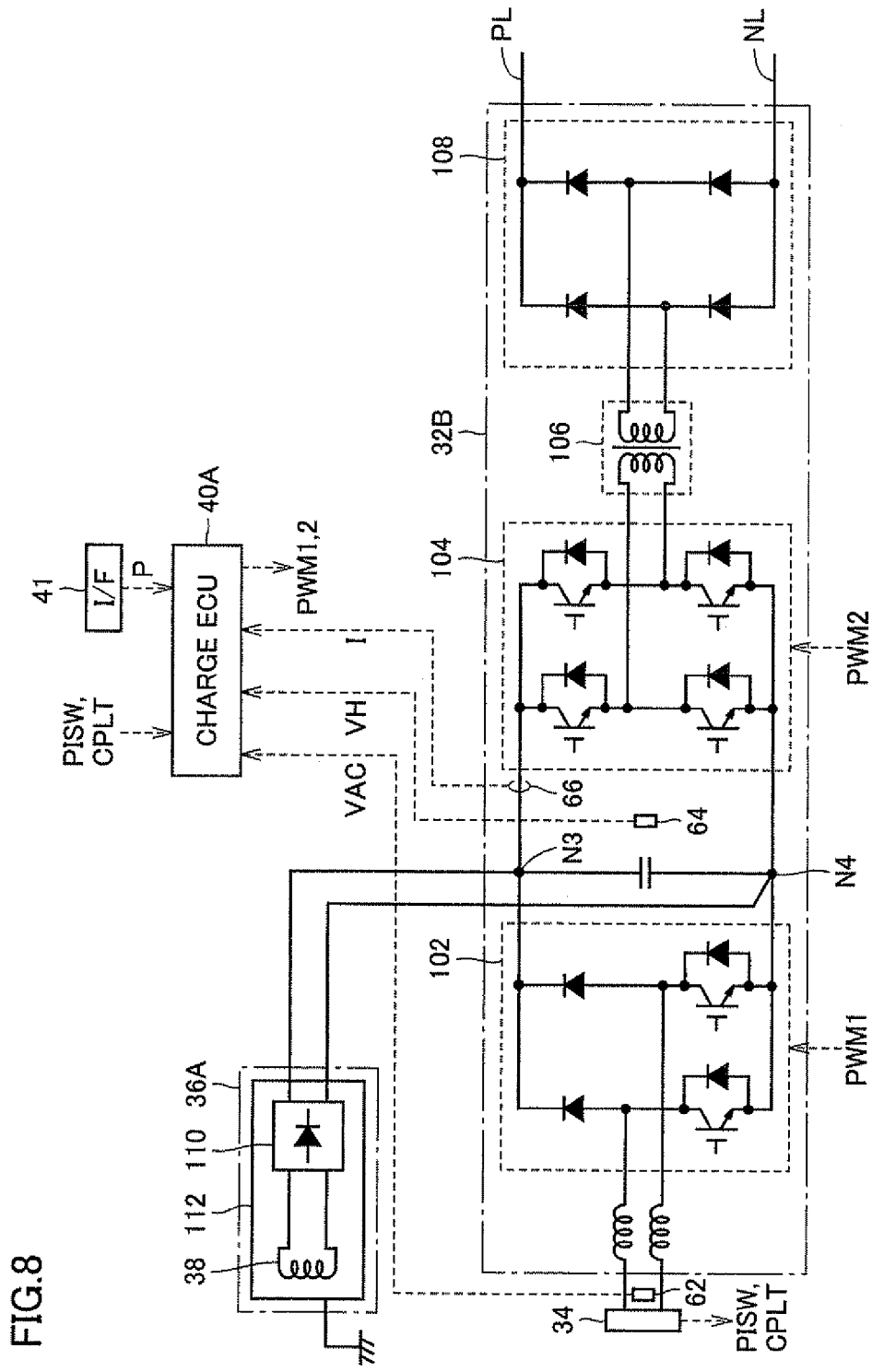
FIG. 8 is a diagram showing a configuration of a charging system in a fourth embodiment.

FIG. 8 is a diagram showing a configuration of a charging system in the fourth embodiment. Referring to FIG. 8, the charging system in the fourth embodiment includes electric power reception terminal 34, a charger 32B, non-contact electric power reception portion 36A, a charge ECU 40A, and communication device 41.

Charger 32B is configured by excluding relays RY1 and RY2 in the configuration of charger 32A in the third embodiment shown in FIG. 7 and by further including a voltage sensor 64 and a current sensor 66. Namely, as rectifier unit 110 is provided in non-contact electric power reception portion 36A, in spite of absence of relays RY1 and RY2, electric power input from electric power reception terminal 34 does not flow to electric power reception coil 38 of non-contact electric power reception portion 36A. In addition, as rectifier unit 102 of charger 32B is provided, electric power received by electric power reception coil 38 of non-contact electric power reception portion 36A does not flow either to electric power reception terminal 34. Therefore, in the present fourth embodiment, conductive charging from electric power reception terminal 34 and non-contact charging using non-contact electric power reception portion 36A can simultaneously be carried out.

Voltage sensor 64 detects a voltage VH between nodes N3 and N4, to which non-contact electric power reception portion 36A is connected, and outputs the detected value to charge ECU 40A. Current sensor 66 detects a current I indicating an input current for inverter 104 and outputs the detected value to charge ECU 40A.

When conductive charging from electric power reception terminal 34 and non-contact charging using non-contact electric power reception portion 36A are simultaneously carried out, charge ECU 40A controls voltage VH to a prescribed target voltage based on electric power received by non-contact electric power reception portion 36A (non-contact-reception electric power) and voltage VH from voltage sensor 64. Specifically, charge ECU 40A sets a target voltage of voltage VH based on magnitude of the non-contact-reception electric power, as shown in the following equation.

$$VHref = \sqrt{(P \times R)} \qquad (1)$$

where P represents non-contact-reception electric power and R represents target impedance. By controlling voltage VH between nodes N3 and N4, to which non-contact electric power reception portion 36A is connected, to target voltage VHref above, impedance can be set to target impedance R without depending on received electric power. By setting, for example, target impedance R based on an impedance value on the power feed facility side, impedance can be matched between the electric power transmission side and the electric power reception side during non-contact charging.

Figure 9:
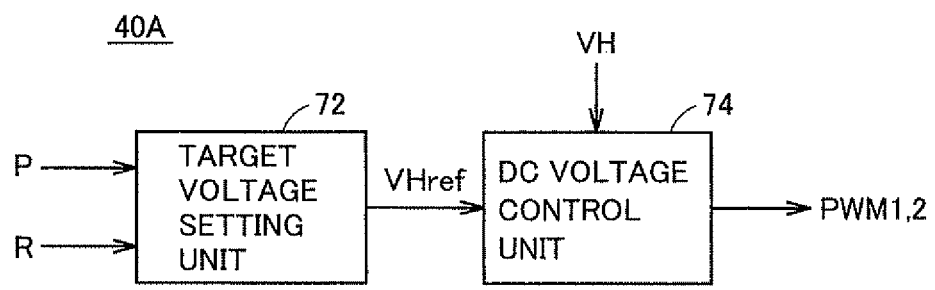
FIG. 9 is a functional block diagram of a portion relating to control of a voltage VH by the charge ECU shown in FIG. 8.

FIG. 9 is a functional block diagram of a portion relating to control of voltage VH by charge ECU 40A shown in FIG. 8. Referring to FIG. 9, charge ECU 40A includes a target voltage setting unit 72 and a DC voltage control unit 74. Target voltage setting unit 72 calculates target voltage VHref in accordance with the equation (1) above, based on non-contact-reception electric power P and target impedance R.

DC voltage control unit 74 generates signal PWM2 for driving inverter 104 and/or signal PWM1 (at the time when conductive charging is simultaneously carried out) for driving rectifier unit 102 such that voltage VH detected by voltage sensor 64 (FIG. 8) attains to target voltage VHref, and outputs the generated signal(s) to inverter 104 and/or rectifier unit 102, (respectively).

As described above, in the present fourth embodiment, as voltage VH between nodes N3 and N4, to which non-contact electric power reception portion 36A is connected, is adjusted based on magnitude of the non-contact-reception electric power, impedance can be matched between the electric power transmission side (the power feed facility) and the electric power reception side (the vehicle). Therefore, according to the present fourth embodiment, further efficient charging can be achieved in a charging device for a vehicle capable of charging by using both of conductive charging (plug-in charging) and non-contact charging.

Figure 10:
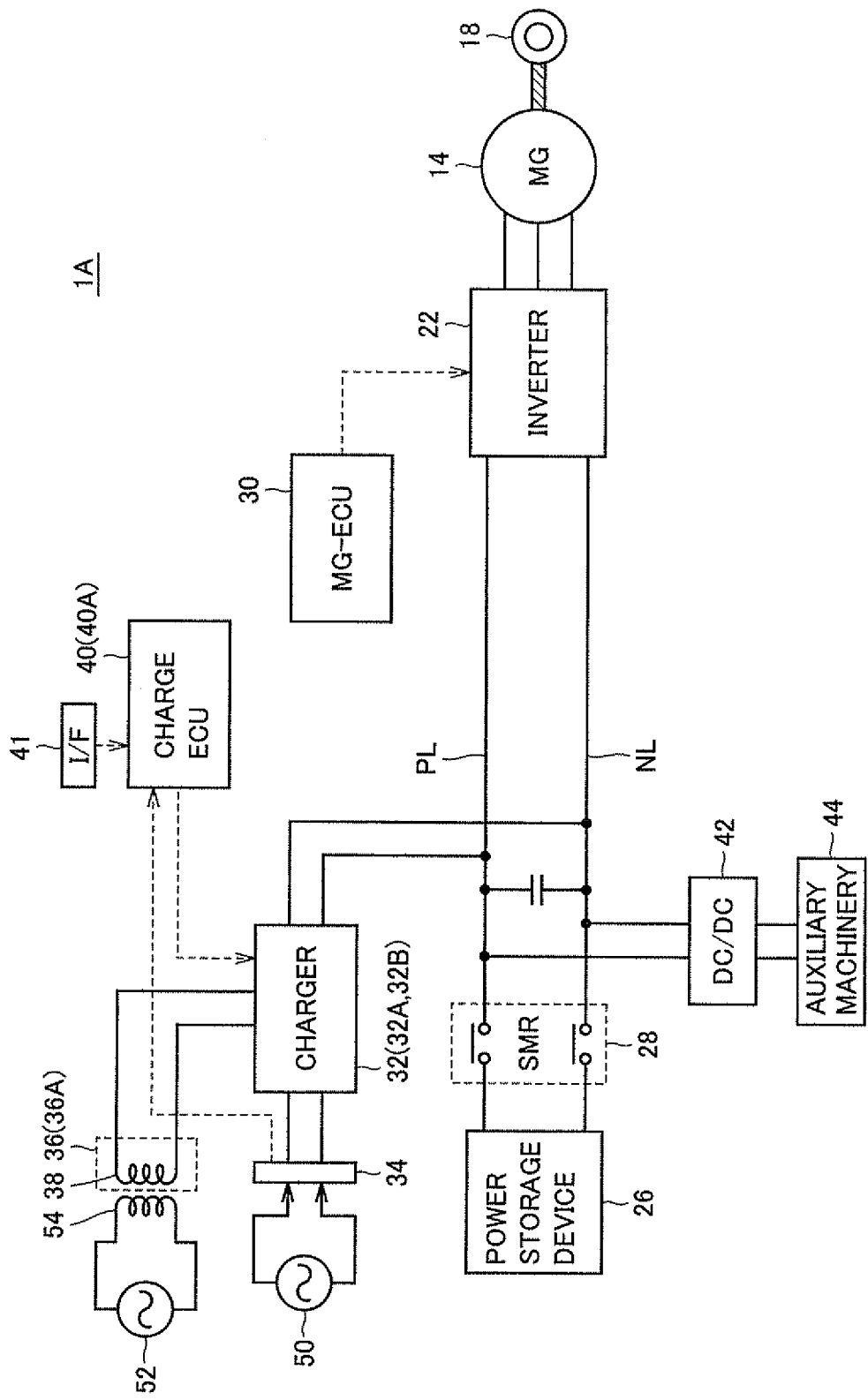
FIG. 10 is a diagram showing an overall configuration of a vehicle not including a converter.

In each embodiment above, vehicle 1 includes converter 24, and charger 32 (32A, 32B) and DC/DC converter 42 are connected between converter 24 and system main relay (SMR) 28. As shown in FIG. 10, however, the present invention is applicable also to a vehicle 1A without including converter 24.

In addition, in the first embodiment above, non-contact electric power reception portion 36 is connected to rectifier unit 102, however, it may be connected to rectifier unit 108. For example, a rectifier element excellent in high-frequency alternating current characteristics, composed, for example, of SiC, GaN or the like may be used for rectifier unit 108, a general rectifier element composed of Si may be used for rectifier unit 102, and non-contact electric power reception portion 36 may be connected to rectifier unit 108 excellent in high-frequency rectification characteristics.

In addition, in the description above, the resonance method has been described with reference to FIG. 3 by way of example of a manner of electric power reception by non-contact electric power reception portion 36, 36A, however, the present invention is not limited to those in which the resonance method is adopted as a manner of electric power reception by non-contact electric power reception portion 36, 36A, and for example, electromagnetic induction may be employed as a manner of electric power reception.

Moreover, in each embodiment above, the charger is connected to positive electrode line PL and negative electrode line NL, however, it may be connected to main positive bus MPL and main negative bus MNL.

Further, in each embodiment above, a series/parallel hybrid car in which motive power of engine 10 can be split by power split device 16 for transmission to driving wheels 18 and motor generator 12 has been described as vehicle 1 (or 1A). The present invention, however, is also applicable to hybrid cars of other types. Specifically, for example, the present invention is also applicable to a series hybrid car in which engine 10 is used only for driving motor generator 12 and driving force for the vehicle is generated only by motor generator 14, a hybrid car in which only regenerative energy out of kinetic energy generated by engine 10 is recovered as electric energy, a motor-assisted hybrid car in which the engine serves as a main power source and a motor assists the engine as appropriate, and the like.

Furthermore, the present invention is also applicable to an electric car that runs only with electric power without including engine 10 or a fuel cell car further including fuel cells in addition to power storage device 26 as a DC power supply.

In the description above, charge ECU 40, 40A corresponds to the "control device" in the present invention, and rectifier unit 102 corresponds to the "first rectifier unit" in the present invention. In addition, rectifier unit 108 corresponds to the "second rectifier unit" in the present invention, and rectifier unit 110 corresponds to the "third rectifier unit" in the present invention.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST 1, 1A vehicle; 10 engine; 12, 14 motor generator; 16 power split device; 18 driving wheel; 20, 22 inverter; 24 converter; 26 power storage device; 28 system main relay; 30 MG-ECU; 32, 32A, 32B charger; 34 electric power reception terminal; 36, 36A non-contact electric power reception portion; 38 electric power reception coil; 38-1 secondary self-resonance coil; 38-2 secondary coil; 40, 40A charge ECU; 41 communication device; 42 DC/DC converter; 44 auxiliary machinery; 50, 52 AC power supply; 54 electric power transmission coil; 54-1 primary self-resonance coil; 54-2 primary coil; 56 load; 62, 64 voltage sensor; 66 current sensor; 72 target voltage setting unit; 74 DC voltage control unit; 102, 108, 110 rectifier unit; 104 inverter; 106 isolation transformer; 112 electromagnetic shielding material; PL positive electrode line; NL negative electrode line; MPL main positive bus; MNL main negative bus; RY1, RY2 relay; and N1 to N4 node

The invention claimed is:

1. A charging device for a vehicle for charging a power storage device mounted on a vehicle from an AC power supply outside the vehicle, comprising:
    an electric power reception terminal configured such that it can electrically be connected to said AC power supply;
    a charger configured to convert AC power input from said electric power reception terminal to a prescribed DC voltage;
    a non-contact electric power reception portion configured to receive electric power in a non-contact manner from said AC power supply as a result of magnetic coupling to an electric power transmission portion of said AC power supply; and
    a control device for controlling said charger to perform charging by using any greater one of first received electric power indicating electric power input from said electric power reception terminal and second received electric power indicating electric power received by said non-contact electric power reception portion.

2. The charging device for a vehicle according to claim 1, wherein
    said control device controls said charger to perform charging by using said first received electric power when lowering in electric power reception efficiency is sensed.

3. The charging device for a vehicle according to claim 1, wherein
    said charger includes
    a first rectifier unit configured to be able to rectify the AC power input from said electric power reception terminal,
    an inverter connected to said first rectifier unit,
    an isolation transformer connected to said inverter, and
    a second rectifier unit configured to rectify an output from said isolation transformer, and
    said non-contact electric power reception portion is connected to any of said first and second rectifier units.

4. The charging device for a vehicle according to claim 1, wherein
    said charger includes
    a first rectifier unit configured to be able to rectify the AC power input from said electric power reception terminal,
    an inverter connected to said first rectifier unit,
    an isolation transformer connected to said inverter, and
    a second rectifier unit configured to rectify an output from said isolation transformer,
    said non-contact electric power reception portion includes
    an electric power reception coil configured to magnetically be coupled to an electric power transmission coil provided in said electric power transmission portion, and
    a third rectifier unit configured to rectify an output from said electric power reception coil, and
    said third rectifier unit is connected between said first rectifier unit and said inverter.

5. A charging device for a vehicle for charging a power storage device mounted on a vehicle from an AC power supply outside the vehicle, comprising:
    an electric power reception terminal configured such that it can electrically be connected to said AC power supply;
    a charger configured to convert AC power input from said electric power reception terminal to a prescribed DC voltage;
    a non-contact electric power reception portion configured to receive electric power in a non-contact manner from said AC power supply as a result of magnetic coupling to an electric power transmission portion of said AC power supply; and
    a control device for controlling said charger,
    said charger including
    a first rectifier unit configured to be able to rectify the AC power input from said electric power reception terminal,
    an inverter connected to said first rectifier unit,
    an isolation transformer connected to said inverter, and
    a second rectifier unit configured to rectify an output from said isolation transformer,
    said non-contact electric power reception portion including
    an electric power reception coil configured to magnetically be coupled to an electric power transmission coil provided in said electric power transmission portion, and
    a third rectifier unit configured to rectify an output from said electric power reception coil,
    said third rectifier unit being connected between said first rectifier unit and said inverter, and
    said control device adjusting a DC voltage between said first rectifier unit and said inverter between which said third rectifier unit is connected based on magnitude of electric power received by said non-contact electric power reception portion, when charging is performed by using electric power received by said non-contact electric power reception portion.

6. The charging device for a vehicle according to claim 5, wherein
    said control device adjusts the DC voltage between said first rectifier unit and said inverter between which said third rectifier unit is connected based on magnitude of electric power received by said non-contact electric power reception portion, when charging is performed simultaneously by using both of electric power received by said non-contact electric power reception portion and electric power input from said electric power reception terminal.

7. The charging device for a vehicle according to claim 5, wherein
said control device adjusts said DC voltage to a square root value of a value obtained by multiplying a value of electric power received by said non-contact electric power reception portion by target impedance.

8. The charging device for a vehicle according to claim 2, wherein
said charger includes
a first rectifier unit configured to be able to rectify the AC power input from said electric power reception terminal,
an inverter connected to said first rectifier unit,
an isolation transformer connected to said inverter, and
a second rectifier unit configured to rectify an output from said isolation transformer, and
said non-contact electric power reception portion is connected to any of said first and second rectifier units.

9. The charging device for a vehicle according to claim 2, wherein
said charger includes
a first rectifier unit configured to be able to rectify the AC power input from said electric power reception terminal,
an inverter connected to said first rectifier unit,
an isolation transformer connected to said inverter, and
a second rectifier unit configured to rectify an output from said isolation transformer,
said non-contact electric power reception portion includes
an electric power reception coil configured to magnetically be coupled to an electric power transmission coil provided in said electric power transmission portion, and
a third rectifier unit configured to rectify an output from said electric power reception coil, and
said third rectifier unit is connected between said first rectifier unit and said inverter.

10. The charging device for a vehicle according to claim 6, wherein
said control device adjusts said DC voltage to a square root value of a value obtained by multiplying a value of electric power received by said non-contact electric power reception portion by target impedance.

* * * * *